US009077233B2

(12) United States Patent
Yoshida et al.

(10) Patent No.: US 9,077,233 B2
(45) Date of Patent: Jul. 7, 2015

(54) INSERTION SYSTEM FOR ELECTRICAL CONDUCTOR

(71) Applicant: Honda Motor Co., Ltd., Tokyo (JP)

(72) Inventors: Toru Yoshida, Tochigi (JP); Mitsuhiro Yamada, Tochigi (JP); Yutaka Matsumoto, Tochigi (JP); Kenichi Ohno, Tochigi (JP); Kazuhito Hiraga, Tochigi (JP); Junji Nakajima, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 13/938,426

(22) Filed: Jul. 10, 2013

(65) Prior Publication Data

US 2014/0013592 A1 Jan. 16, 2014

(30) Foreign Application Priority Data

Jul. 12, 2012 (JP) .................................. 2012-156724

(51) Int. Cl.
*B23P 19/00* (2006.01)
*H02K 15/02* (2006.01)
*H02K 15/085* (2006.01)
*H02K 15/06* (2006.01)

(52) U.S. Cl.
CPC ......... *H02K 15/024* (2013.01); *Y10T 29/53143* (2013.01); *H02K 15/085* (2013.01); *H02K 15/067* (2013.01); *Y10T 29/5313* (2013.01); *Y10T 29/49071* (2013.01); *Y10T 29/532* (2013.01); *Y10T 29/53078* (2013.01); *Y10T 29/49073* (2013.01); *H02K 15/064* (2013.01)

(58) Field of Classification Search
CPC ........... H02K 3/46; H02K 3/314; H02K 3/52; H02K 15/028; H02K 15/067; H02K 15/085; H02K 15/15; Y10T 29/49071; Y10T 29/49073; Y10T 29/53074; Y10T 29/53078; Y10T 29/5313; Y10T 29/53143; Y10T 29/532; Y10T 29/53217; Y10T 29/53243
USPC ............. 29/592.1, 596, 602.1, 605, 606, 717, 29/718, 729, 732, 745, 749, 755, 33 M; 310/179, 184, 207, 208, 215
See application file for complete search history.

(56) References Cited

U.S. PATENT DOCUMENTS 3,824,530 A * 7/1974 Roberts et al. ................ 439/398
4,186,478 A * 2/1980 Hamane et al. ................. 29/596
(Continued)

FOREIGN PATENT DOCUMENTS

JP 2011-097791 5/2011

*Primary Examiner* — Paul D Kim
(74) *Attorney, Agent, or Firm* — Rankin, Hill & Clark LLP

(57) ABSTRACT

An insertion system for electrical conductors is provided that can widen the gap between insulating paper. An insertion system (1) includes: a first moving part (4) that causes a leg of the coil element (10) to move in an insertion direction of a slot (16); a guide part (3) that guides the leg into the slot (16); and a pair of first spreader plates (7A) and a pair of second spreader plates (7B) that can spread at a leading end side thereof, in which these pairs of spreader plates are formed so as to extend inclined relative to the insertion direction so as to approach each other towards a leading end side, and a gap therebetween is narrower than a width of insulating paper (17) at the leading end side, and is wider than a width of the leg of the coil element (10) at a base end side.

8 Claims, 9 Drawing Sheets

(56) References Cited

U.S. PATENT DOCUMENTS

| | | | |
|---|---|---|---|
| 4,600,259 A * | 7/1986 | Olsson | 439/398 |
| 5,542,456 A * | 8/1996 | Nishimura et al. | 140/92.1 |
| 6,249,956 B1 * | 6/2001 | Maeda et al. | 29/596 |
| 6,425,175 B1 * | 7/2002 | Sawada et al. | 29/596 |
| 6,640,421 B2 * | 11/2003 | Katsuzawa et al. | 29/732 |
| 6,749,144 B2 * | 6/2004 | Komuro et al. | 242/432.5 |
| 7,948,140 B2 * | 5/2011 | Sakai et al. | 310/184 |
| 2003/0048022 A1 * | 3/2003 | Nagai et al. | 310/215 |
| 2011/0260572 A1 * | 10/2011 | Hiraga et al. | 310/207 |

\* cited by examiner

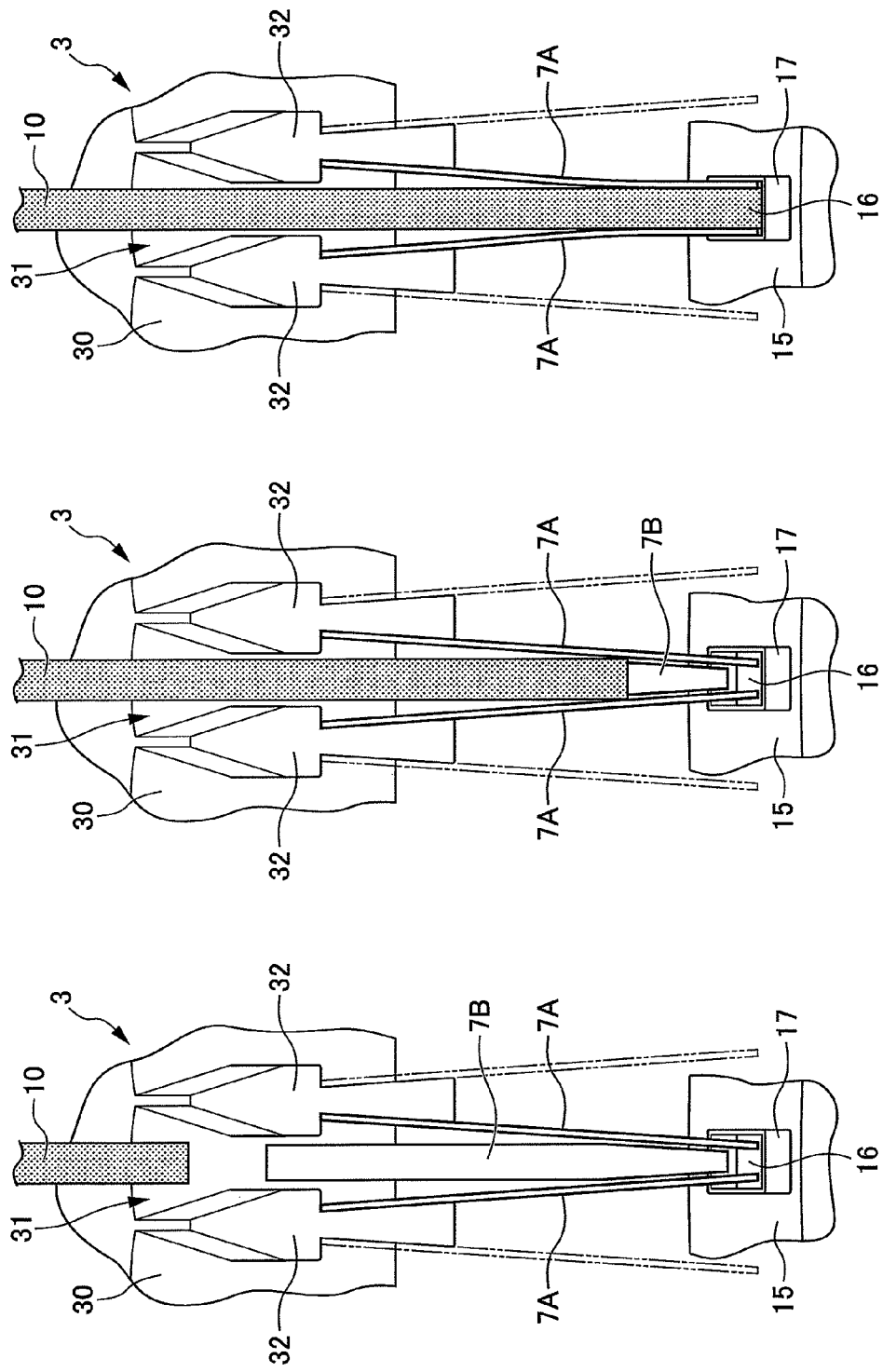

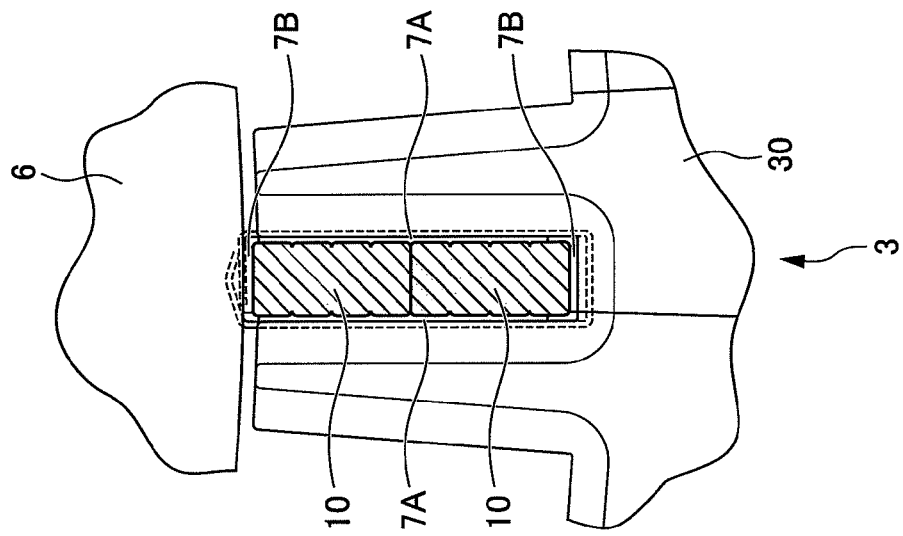
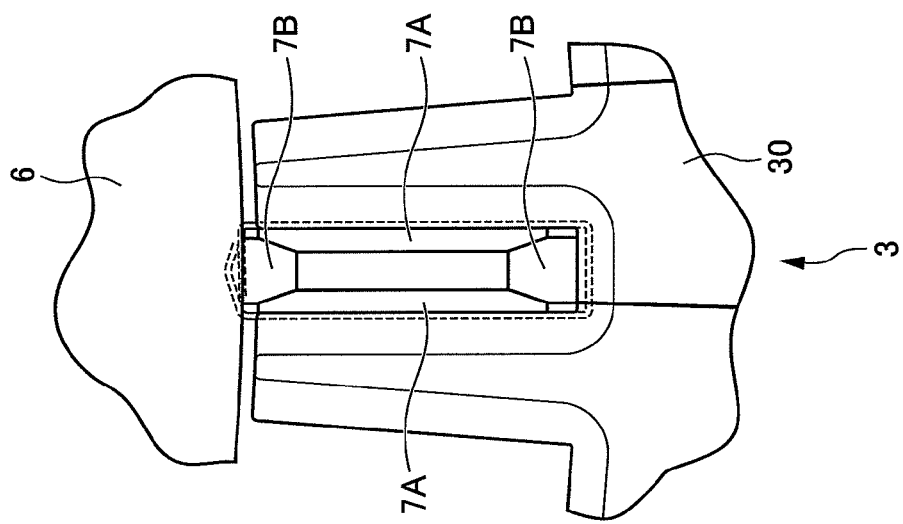
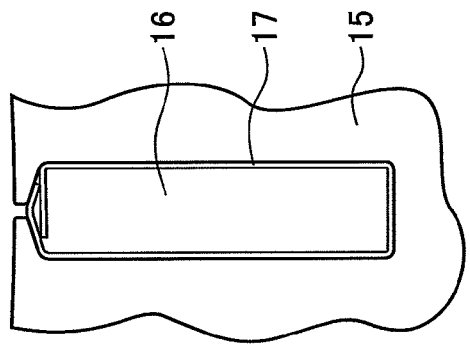

INSERTION SYSTEM FOR ELECTRICAL CONDUCTOR

This application is based on and claims the benefit of priority from Japanese Patent Application No. 2012-156724, filed on 12 Jul. 2012, the content of which is incorporated herein by reference.

BACKGROUND OF THE INVENTION

1. Field of the Invention

The present invention relates to an insertion system for electrical conductors. In detail, it relates to an insertion system that inserts electrical conductors into the slots of a stator core.

2. Related Art

Conventionally, the stator coil of a rotary electric machine is formed by the legs of each substantially U-shaped electrical conductor being inserted into respective slots of a stator core from a central axial direction, and then the ends of each leg being connected together. Insulating paper is inserted inside each substantially rectangular slot so as to cover the all sides thereof, and contact between the electrical conductor and stator core is avoided by way of this insulating paper.

Usually, insulating paper is inserted inside the slot in a state in which the gap between the insulating paper is kept wider than the width of the electrical conductor so that it is possible to insert the electrical insulator into the slot. However, due to trouble, etc. upon inserting the insulating paper, the gap between the insulating paper sometimes narrows. In this case, the leg of the electrical conductor comes to abut the insulating paper and pushes the insulating paper from above, a result of which the insulating paper deforms and it is not possible to push the electrical conductor down to the normal position. Therefore, an insertion system has been proposed that includes an opening fixture that widens the gap between the insulating paper (e.g., refer to Patent Document 1).

[Patent Document 1] Japanese Unexamined Patent Application, Publication No. 2011-97791

SUMMARY OF THE INVENTION

However, with the insertion system of Patent Document 1, so long as the gap between insulating paper is of an extent slightly narrower than usual, it is possible to widen the gap between the insulating paper by the opening fixture; however, in a case of the gap between insulating paper being narrower than expected, it will not be possible to widen the gap between the insulating paper with the structure of the opening fixture.

In addition, although widening the gap between the insulating paper using a drive device is possible, for example, the device becomes complicated and the cost increases in this case.

The present invention has been made taking the above-mentioned matters into consideration, and an object thereof is to provide an insertion system for electrical conductors that can reliably widen the gap between insulating paper by way of an inexpensive and simple configuration.

In order to achieve the above-mentioned object, the present invention provides an insertion system (e.g., the insertion system 1 described later) for electrical conductors that inserts an electrical conductor (e.g., the coil element 10 described later) into a slot (e.g., the slot 16 described later) of a stator core (e.g., the stator core 15 described later) in which insulating paper (e.g., the insulating paper 17 described later) is disposed, including: a first moving part (e.g., the first moving part 4 described later) that causes a leg of the electrical conductor to move in an insertion direction of the slot; a guide part (e.g., the guide part 3 described later) that guides the leg of the electrical conductor moving by way of the first moving part into the slot; and a pair of spreader plates (e.g., the pairs of spreader plates 7A, 7A, 7B, 7B described later) that extends from a leading end of the guide part in the insertion direction, and is capable of spreading at a leading end thereof, in which the pair of spreader plates is respectively formed so as to extend inclined relative to the insertion direction so as to approach each other towards a leading end side, and a gap therebetween is narrower than a width of the insulating paper at the leading end side, and is wider than a width of the leg of the electrical conductor at a base end side, and in a state in which leading ends of the pair of spreader plates are inserted between ends of the insulating paper, when the leg of the electrical conductor is inserted between the pair of spreader plates from a base end side via the guide part by way of the first moving part, between the ends of the insulating paper is spread by the leading end side of the pair of spreader plates spreading, and in this state, the leg of the electrical conductor is inserted into the slot.

The present invention provides the first moving part that causes the leg of the electrical conductor to move in the insertion direction of the slot, the guide part that guides the leg of the electrical conductor moving by way of the first moving part into the slot, and the pair of spreader plates that extends from the leading end of the guide part in the insertion direction and are capable of spreading at the leading end side thereof. In addition, the pair of spreader plates is formed so as to extend inclined relative to the insertion direction, respectively, so as to approach each other towards the leading end side, and to have a gap therebetween that is narrower than the width of the insulating paper at the leading end side and wider than the width of the leg of the electrical conductor at the base end side.

According to the present invention, since the gap at the leading end side of the pair of spreader plates is narrower than the width of the insulating paper, it is possible to easily insert the leading ends of the pair of spreader plates between the ends of the insulating paper. In addition, at this time, the gap at the base end side of the pair of spreader plates is wider than the leg of the electrical conductor; therefore, it is possible to easily insert the leg of the electrical conductor between the pair of spreader plates from the base end side via the guide part by way of the first moving part. Upon doing so, between the ends of the insulating paper is spread by the leading end sides of the pair of spreader plates into which the leg of the electrical conductor has been inserted spreading. Then, in this state, the leg of the electrical conductor is inserted into the slot. Therefore, according to the present invention, even in a case of the gap between the insulating paper being narrow, the gap between the insulating paper can be reliably widened by way of an inexpensive and simple configuration. Furthermore, the electrical conductor can be reliably inserted into the slot.

In this case, it is preferable for the pair of spreader plates to be configured from: a pair of first spreader plates (e.g., the pair of spreader plates 7A, 7A described later) provided so as to correspond to a long side of a slot having a rectangular cross-section; and a pair of second spreader plates (e.g., the pair of spreader plates 7B, 7B described later) provided so as to correspond to a short side of the slot.

In addition, the present invention provides the pair of first spreader plates corresponding to the long sides of the slot having a rectangular cross-section and the pair of second spreader plates corresponding to the short sides of the slot. In other words, the leading end of the guide part is made into a state surrounded by this pair of first spreader plates and pair of second spreader plates.

Incidentally, the insulating paper is normally inserted inside of the slot having a rectangular cross-section so as to cover the all sides thereof. In this regard, according to the present invention, it is possible to reliably widen the gap between the insulating paper even if the gap between the insulating paper becomes narrow in any direction due to some sort of defect, since the pair of spreader plates are disposed at all of the sides of the long side and the short side of the slot.

In this case, it is preferable for the guide part to have a tapered structure (e.g., the tapered structure 31 described later) that spreads in an opposite direction to the insertion direction.

In addition, the present invention configures the guide part in the tapered structure, which spreads in an opposite direction to the insertion direction. The leg of the electrical conductor can thereby be easily inserted between the pair of spreader plates by way of the guide part of the tapered structure, and thus the leg of the electrical conductor can be easily guided to a position allowing insertion into the slot. Therefore, according to the present invention, it is possible to reliably insert into the slot even if there is displacement in the position of the leg of the electrical conductor.

In this case, it is preferable for the guide part to be provided in an annular shape and multiply partitioned in multiply partitioned guide parts in a circumferential direction, and the insertion system to further include a second moving part (e.g., the second moving part 5 described later) that causes the multiply partitioned guide parts (e.g., the partitioned guide part 30 described later) to respectively move in a radial direction.

In addition, the present invention provides the guide part in an annular shape, as well as multiply partitioning the guide part in the circumferential direction. Moreover, the second moving part is provided that causes each of the partitioned guide parts to move in the radial direction. It is thereby possible to cause the guide parts to move outwards in the radial direction after the leg of the electrical conductor has been inserted between the insulating paper inside of the slot, and thus it is possible to avoid becoming an obstruction to the insertion operation.

According to the present invention, an insertion system for electrical conductors can be provided that is able to reliably widen a gap between insulating paper by way of an inexpensive and simple configuration.

BRIEF DESCRIPTION OF THE DRAWINGS

FIG. 8A is a view illustrating operation of the pair of spreader plates according to the embodiment, and is a view showing an aspect of a leg of the coil element being inserted between the pair of spreader plates by way of the guide parts;

FIG. 8B is a view illustrating operation of the pair of spreader plates according to the embodiment, and is a view showing an aspect when the leg of the coil element has been inserted between the pair of plates;

FIG. 8C is a view illustrating operation of the pair of plates according to the embodiment, and is a view showing an aspect when a leading end side of the pair of spreader plates are spread by the leg of the coil element having been inserted;

FIG. 9A is a view illustrating operation of the pair of spreader plates according to the embodiment, and is a plan view of the slot;

FIG. 9B is a view illustrating operation of the pair of spreader plates according to the embodiment, and is a plan view showing a state in which the insertion system is disposed over the slot; and FIG. 9C is a view illustrating operation of the pair of spreader plates according to the embodiment, and is a plan view showing a state in which the leg of the coil element has been inserted in the slot.

DETAILED DESCRIPTION OF THE INVENTION

Hereinafter, an embodiment of the present invention will be explained in detail while referencing the drawings.

An insertion system 1 according to the present embodiment inserts a substantially U-shaped electrical conductor into slots of a stator core in which insulating paper has been arranged. As the electrical conductor, one can be used in which a plurality of substantially U-shaped coil elements for rotary electric machines is aligned in an annular shape while overlapping in the circumferential direction.

Figure 1:
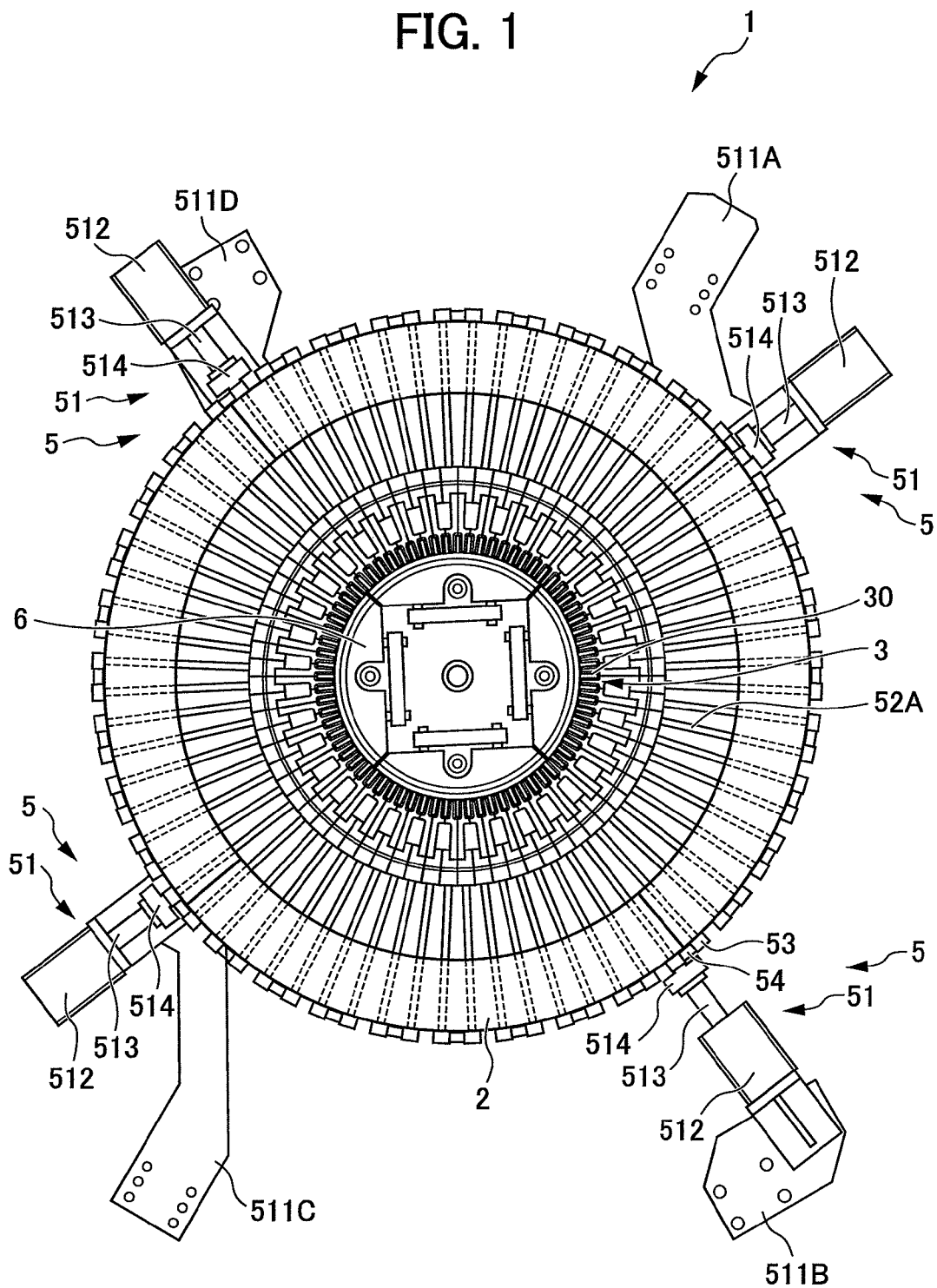
FIG. 1 is a plan view of an insertion system according to an embodiment of the present invention, and is a view showing a state in which guide parts have advanced to gather inside in a radial direction.
Figure 2:
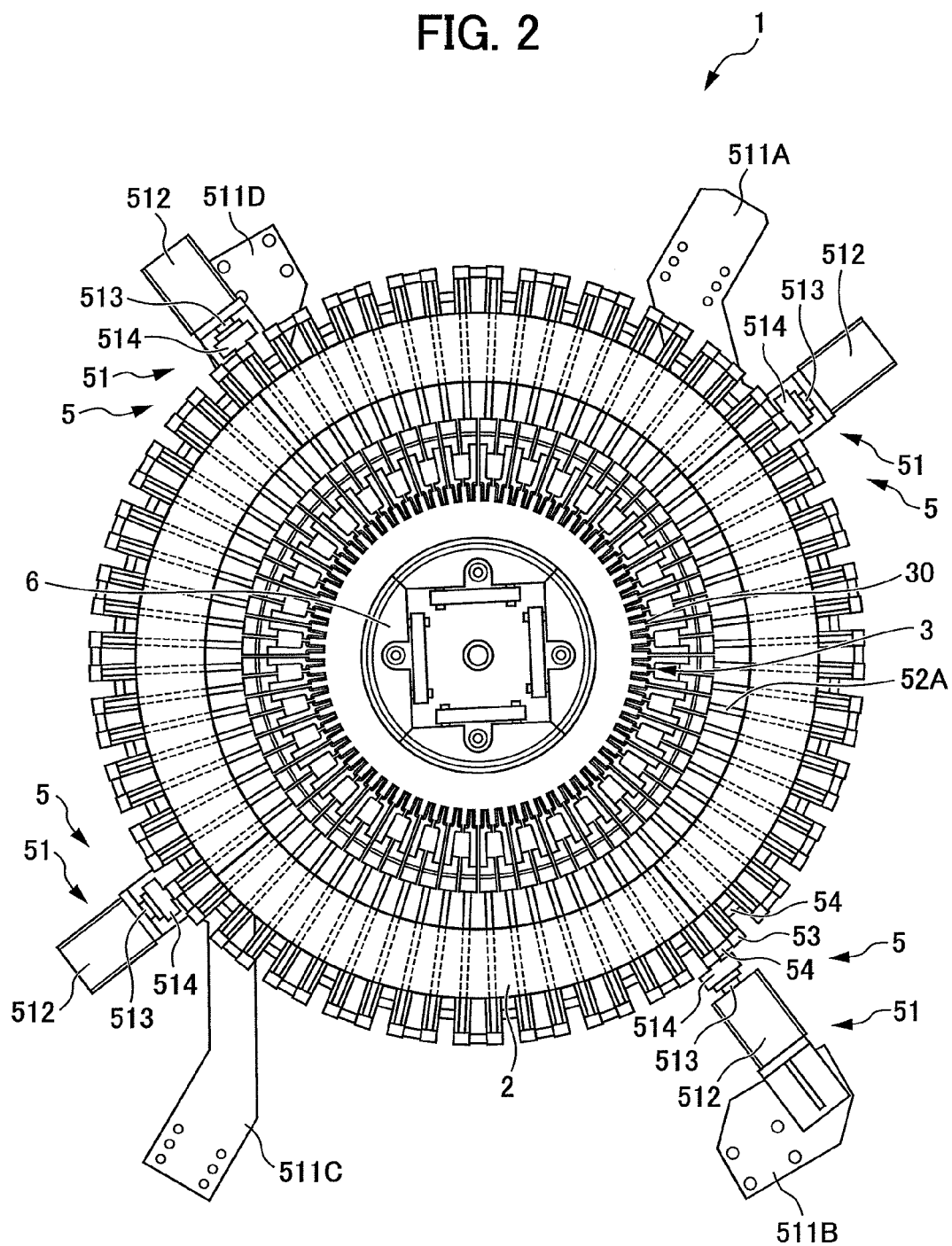
FIG. 2 is a perspective view of the insertion system according to the embodiment, and is a view showing a state in which the guide parts have retracted and scattered outwards in the radial direction.
Figure 3:
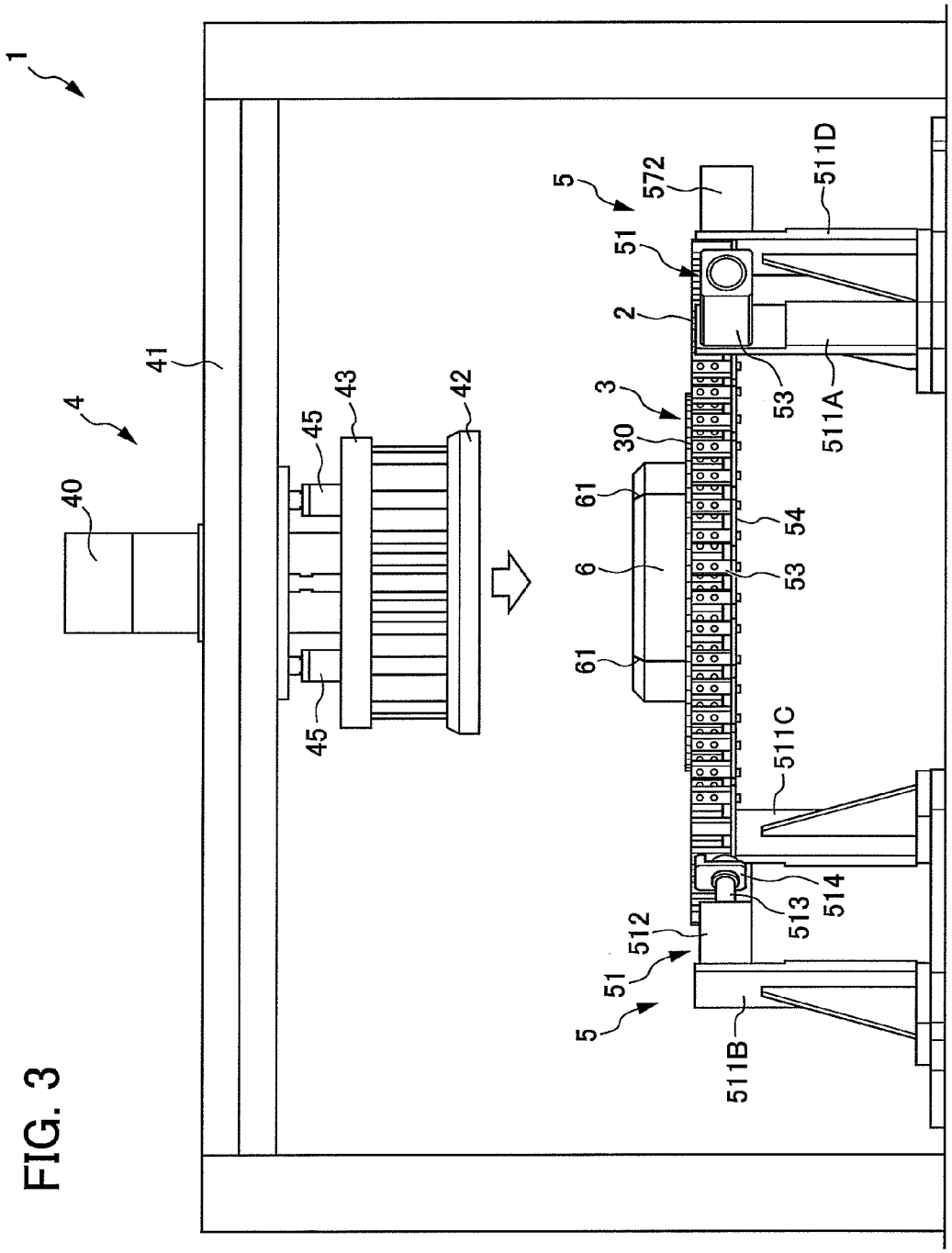
FIG. 3 is a side view of the insertion system according to the embodiment.

FIGS. 1 and 2 are plan views of the insertion system 1 according to one embodiment of the present invention. In more detail, FIG. 1 is a view showing a state in which guide parts described later have advanced to gather at the inside in the radial direction, and FIG. 2 is a view showing a state in which the guide parts have retracted to scatter to the outside in the radial direction. In addition, FIG. 3 is a side view of the insertion system 1. It should be noted that FIGS. 1 and 2 are illustrated by omitting the illustration of a first moving part described later for convenience.

As shown in FIGS. 1 to 3, the insertion system 1 includes a base 2, guide parts 3, first moving parts 4, second moving parts 5, and an inner-circumferential guide 6. In addition, the insertion system 1 further includes pairs of spreader plates, which are not illustrated in FIGS. 1 to 3.

The base 2 consists of an annular flat plate, and supports a slide mechanism 20 serving as the second moving part that supports the guide parts 3 described later. In the insertion system 1 according to the present embodiment, a stator core of a rotary electric machine that is not illustrated is disposed below the center of the base 2. In addition, an array apparatus (not illustrated) causing the plurality of substantially U-shaped coil elements to be aligned in an annular shape while overlapping in the circumferential direction is disposed at the upper side of the base 2. For this reason, the plurality of coil elements aligned in an annular shape is disposed at the outer circumference of the inner-circumferential guide 6 disposed at the center of the base 2. It thereby becomes possible to insert the legs of the plurality of coil elements aligned in an annular shape by the array apparatus in each of the slots of the stator core, by way of the insertion system 1 according to the present embodiment.

The first moving parts 4 cause the legs of the coil elements to move in the insertion direction of the slots of the stator core. As shown in FIG. 3, the first moving part 4 includes a first support 41, an actuator 40 that is supported by the first support 41, an annular body 42, a circular body 43, and first cylinder mechanisms 45, 45 that cause the annular body 42 and circular body 43 to raise and lower.

The annular body 42 is an annular body of a somewhat larger diameter than the inner-circumferential guide 6 disposed below. When the annular body 42 and circular body 43 are lowered by the first cylinder mechanisms 45, 45 being driven by the actuator 40, first, the annular body 42 fits on the outer circumference of the inner-circumferential guide 6, and then slides on the outer circumference thereof to lower. At this time, since a plurality of slits 61 extending in a central axial direction is provided at the outer circumference of the inner-circumferential guide 6, the inner-circumferential guide 6 somewhat contracts inwards in the radial direction by the annular body 42 fitting.

Furthermore, at this time, the annular body 42 abuts a top part of the plurality of coil elements (not illustrated) that is aligned in an annular shape at the outer circumference of the inner-circumferential guide 6, thereby pushing these coil elements downwards. The legs of the plurality of coil elements aligned in an annular shape are thereby guided by way of the insertion system 1 according to the present embodiment so as to be inserted into the slots of the stator core (not illustrated) disposed below.

In addition, the circular body 43 lowers similarly to the annular body 42, and before long abuts the top part of the inner-circumferential guide 6. The lowering of the annular body 42 is thereby restricted, and is configured so as not to allow the coil elements to move downwards more than necessary.

The second moving parts 5 cause each partitioned guide part 30 into which the guide part 3 described later is multiply partitioned in the circumferential direction to move in the radial direction.

The second moving part 5 includes four second cylinder mechanisms 51, a slide pin 52A and spring slide pin 52B provided to each of the plurality of partitioned guide parts 30, a connecting part 53 that connects a base end (outside end in the radial direction) of these slide pins, and a link mechanism 54 that is provided at a bottom side of the connecting parts 53 and connects adjacent connecting parts 53.

The four second cylinder mechanisms 51 are disposed at equal intervals in the circumferential direction. The second cylinder mechanism 51 includes second supports 511 (511A to D), a cylinder 512 of cylindrical shape supported by the second supports 511, a piston (not illustrated) provided to be able to reciprocate inside of the cylinder 512, a rod 513 joined to the piston, and a joint 514 that is provided at a leading end of the rod 513 and joins to the aforementioned connecting part 53. The driving force of the second cylinder mechanism 51 is transmitted to each slide pin via the joint 514, connecting part 53 and link mechanism 54.

Figure 4:
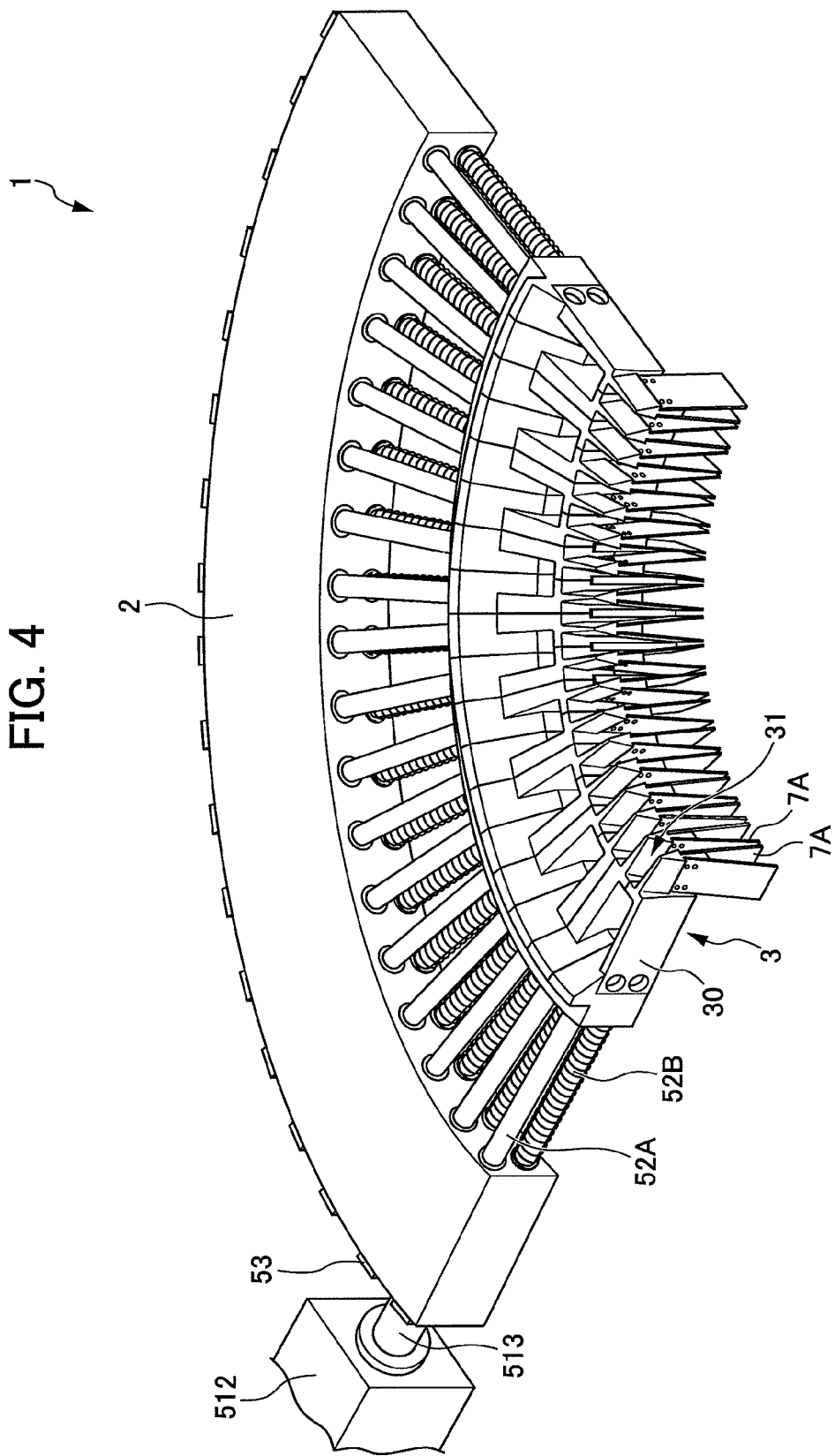
FIG. 4 is a perspective view when viewing the insertion system according to the embodiment from inside in the radial direction.

FIG. 4 is a perspective view when viewing the insertion system 1 according to the present embodiment from inside in the radial direction. As shown in FIG. 4, the slide pin 52A and the spring slide pin 52B are provided to each of the partitioned guide parts 30, and the leading ends thereof are joined to each of the partitioned guide parts 30. The slide pin 52A is provided at an upper side, and the spring slide pin 52B is provided at a lower side. These slide pins all penetrate the base 2 in the radial direction, and the base ends (outside end in the radial direction) are connected by the connecting part 53. These slide pins allow each partitioned guide part 30 to move in the radial direction by receiving the driving force of the second cylinder mechanism 51 and sliding in the radial direction.

In more detail, when not receiving the driving force of the second cylinder mechanism 51, each slide pin slides to the inside in the radial direction due to the biasing force of the spring of the spring slide pin 52B. Each of the partitioned guide parts 30 thereby advances to gather at the inside in the radial direction.

In addition, when receiving the driving force of the second cylinder mechanism 51, each slide pin slides to the outside in the radial direction against the biasing force of the spring. Each of the partitioned guide parts 30 thereby retracts and scatters to the outside in the radial direction.

It should be noted that, by changing the second cylinder mechanism 51 to a cylinder capable of reciprocating motion, it is possible to make the spring unnecessary.

Figure 5:
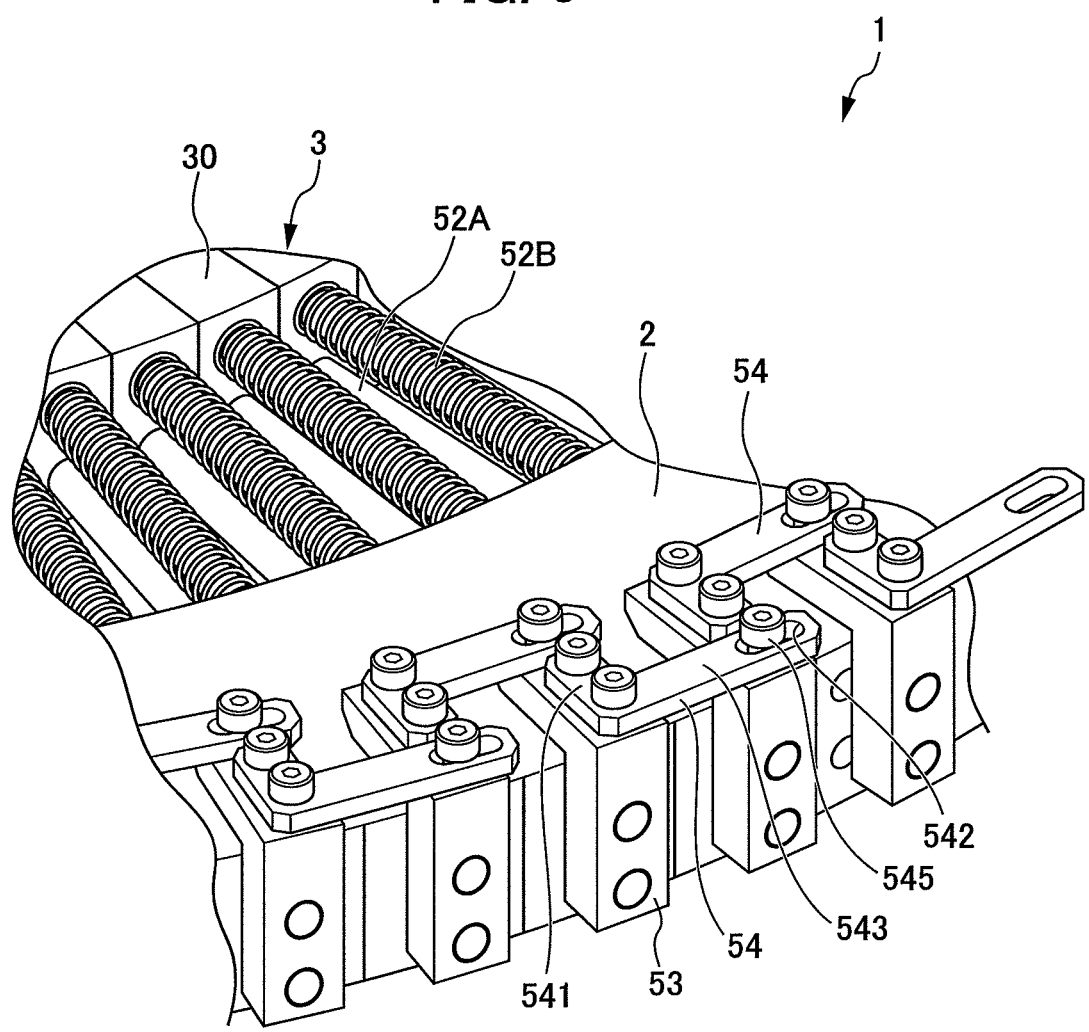
FIG. 5 is a perspective view when viewing a bottom side of the insertion system according to the embodiment from outside in the radial direction.

FIG. 5 is a perspective view when viewing the bottom side of the insertion system 1 according to the present embodiment from outside in the radial direction. As shown in FIG. 5, for the connecting part 53 that connects the base ends (outside ends in the radial direction) of each slide pin, adjacent connecting parts 53 are joined on the bottom side thereof by the L-shaped link mechanism 54.

As shown in FIG. 5, the link mechanism 54 is configured by an L-shaped plate member consisting of a short arm 541 and a long arm 543 in which a slotted hole 542 is formed, and a bolt 545. With this link mechanism 54, the short arm 541 is fixed to the bottom of one connecting part 53. The slotted hole 542 formed in the long arm 543 is formed in a width smaller than the diameter of the head of the bolt 545, and slightly larger than the diameter of the shaft of the bolt 545. In a state in which the shaft of the bolt 545 is inserted into this slotted hole 542, and a gap is maintained between the long arm 543 and the head of the bolt 545, the bolt 545 is fixed to the bottom of the other connecting part 53. While the movement of the bolt 545 in the width direction inside of the slotted hole 542 is thereby restricted, movement of the bolt 545 in the length direction inside of the slotted hole 542 is permitted. For this reason, the connecting part 53 follows the motion in the radial direction of an adjacent connecting part 53 to move in the radial direction.

The guide part 3 guides the leg of the coil element moving by way of the first moving part 4 into the slot of the stator core. Referring back to FIG. 4, the guide part 3 is provided in an annular shape, and is configured from the partitioned guide parts 30 multiply partitioned in the circumferential direction as described above.

The guide part 3 has at a leading end side thereof (inside in the radial direction) a tapered structure 31 that spreads in an opposite direction to the insertion direction (downwards in FIG. 4).

In addition, below the tapered structure 31 of the guide part 3, a pair of first spreader plates 7A, 7A and a pair of second spreader plates 7B, 7B are provided to every tapered structure 31 as the pairs of spreader plates. However, in FIG. 4, illustration for the near side spreader plate of the second spreader plates is omitted for convenience (similarly to FIGS. 6 and 8).

It should be noted that the pair of first spreader plates 7A, 7A is provided to correspond to a long side of the slot 16 having a rectangular cross-section described later. In addition, the pair of second spreader plates 7B, 7B is provided to correspond to the short side of the slot 16.

Figure 6:
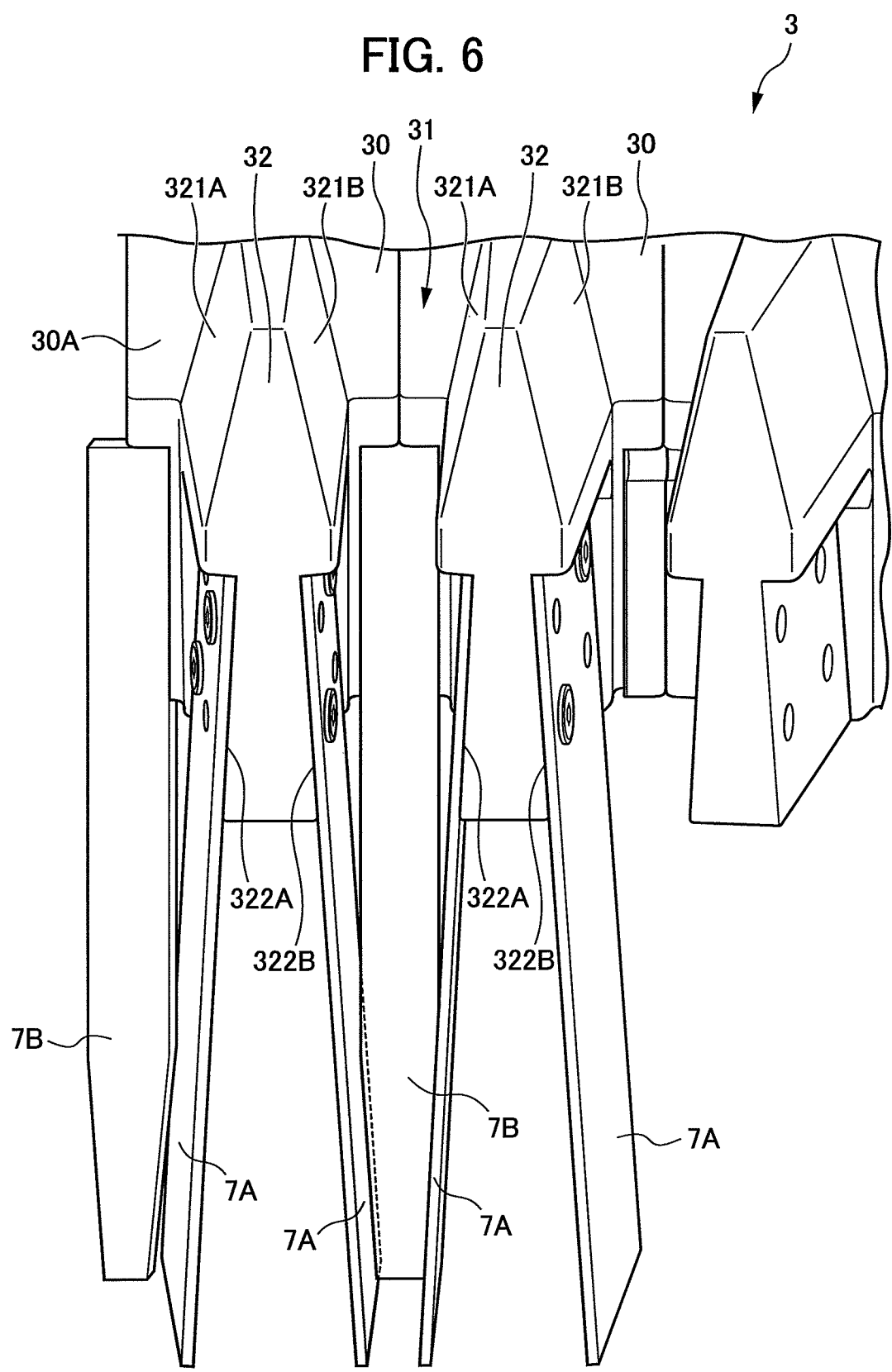
FIG. 6 is an enlarged view when viewing the guide parts and pairs of spreader plates according to the embodiment from inside in the radial direction.

FIG. 6 is an enlarged view when viewing the guide part 3 and pairs of spreader plates according to the present embodiment from inside in the radial direction.

As shown in FIG. 6, the tapered structure 31 of the guide part 3 is formed by projecting parts 32 of arrow shape in a cross-section projecting from the leading end face 30A of the partitioned guide part 30 adjoining. In more detail, upper side faces 321A, 321B of the projecting part 32 incline so as to separate from each other toward downwards, and the tapered structure 31 is formed by the upper side faces 321A, 321B of the projecting parts 32, 32 adjacent to each other.

The pair of first spreader plates 7A, 7A and the pair of second spreader plates 7B, 7B extend in the insertion direction (downwards in FIG. 6) from the leading end of the guide part 3. Herein, the lower side faces 322A, 322B of the projecting part 32 incline so as to separate from each other toward downwards; therefore, the tapered structure spreading in an opposite direction to the insertion direction (downwards in FIG. 4) is being formed at the lower part of the projecting part by the lower side faces 322A, 322B of the projecting parts 32, 32 adjacent to each other.

The pair of first spreader plates 7A, 7A is joined to the lower side faces 322A, 322B of the projecting part 32, and extend downwards along these lower side faces 322A, 322B. In other words, the pair of first spreader plates 7A, 7A respectively extends inclined relative to the insertion direction, so as to approach each other toward the leading end side (downwards in FIG. 6).

Figure 7:
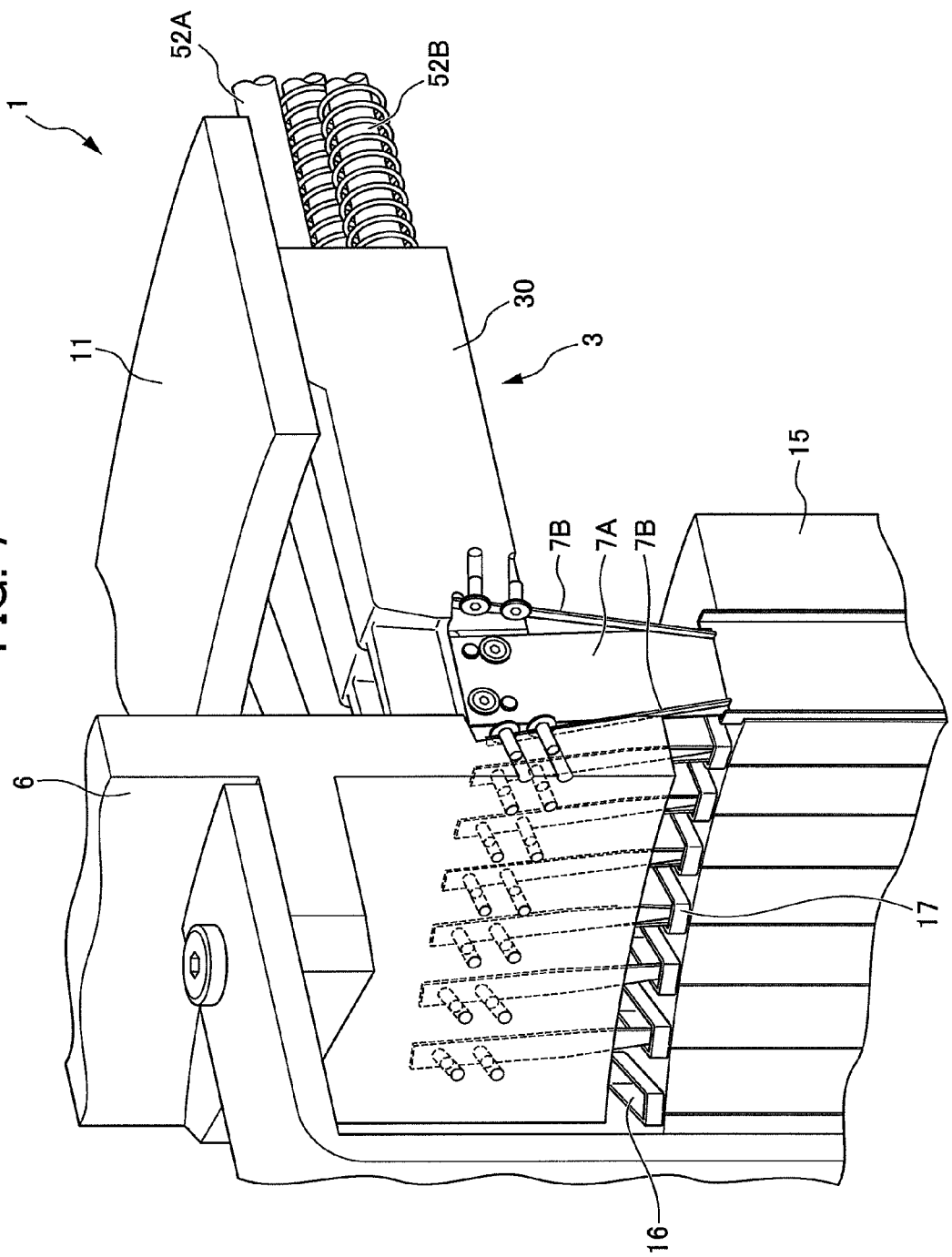
FIG. 7 is a perspective view showing a state when inserting a coil element into slots of the stator core by way of the insertion system according to the embodiment.

Similarly, the pair of second spreader plates 7B, 7B also respectively extends inclined relative to the insertion direction so as to approach each other toward the leading end side (downwards in FIG. 6). It should be noted that the second spreader plate at the back side is connected to a sloped face (face sloped downwards to inside in the radial direction) formed at the lower part of a leading end face of the guide part 3, and the second spreader plate at the front side is connected to a sloped face (face sloped downwards to inside in the radial direction) formed at the outer circumference of the inner-circumferential guide 6 as shown in FIG. 7 described later.

In addition, these pairs of spreader plates are formed to enable leading end sides thereof to spread by bending. A gap therebetween is formed to be narrower than the width of the insulating paper at a leading end side, and is formed to be wider the width of the leg of the coil element at the base end side.

The insertion system 1 according to the present embodiment operates as follows.

First, without driving the second cylinder mechanism 51, each slide pin is made to slide inside in the radial direction by way of the biasing force of the spring slide pin 52B. Each of the partitioned guide parts 30 is thereby made to advance to gather to the inside in the radial direction.

Here, FIG. 7 is a perspective view showing a state when inserting coil elements into the slots 16 of the stator core 15 by way of the insertion system 1 according to the present embodiment. As shown in FIG. 7, the ends on the insertion side of insulating paper 17 installed inside of the slots 16 of the stator core 15 protrude somewhat from the slots 16. For this reason, by simply causing the guide part 3 to slide to inside in the radial direction, the leading ends of the pair of first spreader plates 7A, 7A and the pair of second spreader plates 7B, 7B enter a state inserted between the insulating paper 17 installed inside of the slots 16 of the stator core 15.

Next, in this state, the plurality of coil elements are aligned to be arranged in an annular shape by the array device 11, at the outer circumference of the inner-circumferential guide 6 arranged at the center of the base 2. Although illustration of the coil elements is omitted in FIG. 7, the plurality of coil elements is aligned in an annular shape by way of the array apparatus 11 arranged above the insertion system 1.

Next, the first cylinder mechanisms 45, 45 are driven by the actuator 40 to lower the annular body 42 and circular body 43. When this is done, the annular body 42 fits with the outer circumference of the inner-circumferential guide 6, slides on the outer circumference thereof to lower, and the inner-circumferential guide 6 including the slits 61 somewhat contracts inwards in the radial direction. In addition, at this time, the annular body 42 abuts the upper part of the plurality of coil elements aligned in an annular shape at the outer circumference of the inner-circumferential guide 6, and presses these coil elements downwards. The legs of the plurality of coil elements aligned in an annular shape are guided by the guide parts 3 of the insertion system 1.

Herein, FIGS. 8A, 8B and 8C are drawings illustrating the operation of the pair of first spreader plates 7A, 7A and the pair of second spreader plates 7B, 7B according to the present embodiment, and are views when viewing the guide part 3 from inside in the radial direction.

As shown in FIG. 8A, the guide part 3 has a tapered structure that spreads in an opposite direction to the insertion direction; therefore, even if the position of the leg of the coil element 10 and position of the guide part 3 are somewhat displaced, the leg of the coil element 10 is reliably guided between the pair of first spreader plates 7A, 7A and between the pair of second spreader plates 7B, 7B.

Next, as shown in FIG. 8B, the leg of the coil element 10 is inserted between the pair of first spreader plates 7A, 7A and the pair of second spreader plates 7B, 7B.

Next, as shown in FIG. 8C, when the leg of the coil element 10 is inserted up to the leading end of each spreader plates, the leading end sides of the pair of first spreader plates 7A, 7A and the pair of second spreader plates 7B, 7B spread. Between the ends of the insulating paper 17 is thereby spread, and the leg of the coil element 10 is inserted into the slot 16 in this state.

Herein, FIGS. 9A, 9B and 9C are drawings for illustrating operations of the pair of first spreader plates 7A, 7A and the pair of second spreader plates 7B, 7B according to the present embodiment, and are plan views in the vicinity of the slot 16.

As shown in FIG. 9A, in a state in which the guide parts 3 are still not gathered, the guide parts 3 are not arranged over the slots 16.

Next, as shown in FIG. 9B, when the guide parts 3 gather, the guide parts are arranged over the slots 16. At this time, the pair of first spreader plates 7A, 7A and the pair of second spreader plates 7B, 7B both have gaps at the leading end sides thereof that narrows.

Next, as shown in FIG. 9C, when guided by the guide part 3 and the leg of the coil element 10 is inserted between the pair of first spreader plates 7A, 7A and between the pair of second spreader plates 7B, 7B, the ends of the insulating paper 17 are spread by the leading end side of these spreader plates being spread.

The ends of the insulating paper 17 are spread in the above way so that the leg of the coil element 10 is reliably inserted in the slot 16.

According to the insertion system 1 according to the present embodiment, the following effects are exerted.

The present embodiment provides the first moving part 4 that causes the leg of the coil element 10 to move in the insertion direction of the slot 16, the guide part 3 that guides the leg of the coil element 10 moving by way of the first moving part 4 into the slot 16, and the pair of first spreader plates 7A, 7A and the pair of second spreader plates 7B, 7B that extend from the leading end of the guide part 3 in the insertion direction and are capable of spreading at the leading end side thereof. In addition, the pair of first spreader plates 7A, 7A and the pair of second spreader plates 7B, 7B are formed so as to extend inclined relative to the insertion direction, respectively, so as to approach each other toward the leading end side, and to have a gap therebetween that is narrower than the width of the insulating paper 17 at the leading end side and wider than the width of the leg of the coil element 10 at the base end side.

According to the present embodiment, since the gaps at the leading end sides of the pair of first spreader plates 7A, 7A and the pair of second spreader plates 7B, 7B are narrower than the width of the insulating paper 17, it is possible to easily insert the leading ends of the pair of first spreader plates 7A, 7A and the pair of second spreader plates 7B, 7B between the ends of the insulating paper 17. In addition, at this time, the gaps at the base end sides of the pair of first spreader plates 7A, 7A and the pair of second spreader plates 7B, 7B are wider than the leg of the coil elements 10; therefore, it is possible to easily insert the leg of the coil element 10 between the pair of first spreader plates 7A, 7A and the pair of second spreader plates 7B, 7B from the base end side via the guide part 3 by way of the first moving part 4. Upon doing so, between the ends of the insulating paper 17 is spread by the leading end sides of the pair of first spreader plates 7A, 7A and the pair of second spreader plates 7B, 7B into which the leg of the coil element 10 has been inserted spreading. Then, in this state, the leg of the coil element 10 is inserted into the slot 16. Therefore, according to the present embodiment, even in a case of the gap between the insulating paper 17 being narrow, the gap between the insulating paper 17 can be reliably widened by way of an inexpensive and simple configuration. Furthermore, the coil element 10 can be reliably inserted into the slot 16.

In addition, the present embodiment provides the pair of first spreader plates 7A, 7A corresponding to the long sides of the slot 16 having a rectangular cross-section and the pair of second spreader plates 7B, 7B corresponding to the short sides of the slot 16. In other words, the leading end of the guide part 3 is made into a state surrounded by this pair of first spreader plates 7A, 7A and pair of second spreader plates 7B, 7B.

Incidentally, the insulating paper 17 is normally inserted inside of the slot 16 having a rectangular cross-section so as to cover the all sides thereof. In this regard, according to the present embodiment, it is possible to reliably widen the gap between the insulating paper 17 even if the gap between the insulating paper 17 becomes narrow in any direction due to some sort of defect, since the pair of spreader plates are disposed at all of the sides of the long side and the short side of the slot 16.

In addition, the present embodiment configures the guide part 3 in the tapered structure 31, which spreads in an opposite direction to the insertion direction. The leg of the coil element 10 can thereby be easily inserted between the pair of first spreader plates 7A, 7A and the pair of second spreader plates 7B, 7B by way of the guide part 3 of the tapered structure 31, and thus the leg of the coil element 10 can be easily guided to a position allowing insertion into the slot 16. Therefore, according to the present embodiment, it is possible to reliably insert into the slot 16 even if there is displacement in the position of the leg of the coil element 10.

In addition, the present embodiment provides the guide parts 3 in an annular shape, as well as multiply partitioning the guide parts 3 in the circumferential direction. Moreover, the second moving part 5 is provided that causes each of the partitioned guide parts to move in the radial direction. It is thereby possible to cause the guide parts 3 to move outwards in the radial direction after the legs of the coil element 10 have been inserted between the insulating paper 17 inside of the slots 16, and thus it is possible to avoid becoming an obstruction to the insertion operation.

It should be noted that the present invention is not to be limited to the above-mentioned embodiment, and that modifications and improvements within a scope that can achieve the objects of the present invention are encompassed by the present invention.

For example, although a substantially U-shaped coil element for a rotary electric machine is used as the electrical conductor in the above-mentioned embodiment, it is not particularly limited so long as being an electrical conductor.

What is claimed is:

1. An insertion system for electrical conductors that inserts an electrical conductor into a slot of a stator core in which insulating paper is disposed, comprising:
    a first moving part that causes a leg of the electrical conductor to move in an insertion direction of the slot;
    a guide part that guides the leg of the electrical conductor moving by way of the first moving part into the slot; and
    a pair of spreader plates that extends from a leading end of the guide part in the insertion direction, and is capable of spreading at a leading end thereof,
    wherein the pair of spreader plates is respectively formed so as to extend inclined relative to the insertion direction so as to approach each other towards a leading end side, and a gap therebetween is narrower than a width of the insulating paper at the leading end side, and is wider than a width of the leg of the electrical conductor at a base end side, and
    wherein in a state in which leading ends of the pair of spreader plates are inserted between ends of the insulating paper, when the leg of the electrical conductor is inserted between the pair of spreader plates from a base end side via the guide part by way of the first moving part, between the ends of the insulating paper is spread by the leading end side of the pair of spreader plates spreading, and in this state, the leg of the electrical conductor is inserted into the slot.

2. The insertion system for electrical conductors according to claim 1, wherein the pair of spreader plates includes:
    a pair of first spreader plates provided so as to correspond to a long side of a slot having a rectangular cross-section; and
    a pair of second spreader plates provided so as to correspond to a short side of the slot.

3. The insertion system for electrical conductors according to claim 2, wherein the guide part has a tapered structure that spreads in an opposite direction to the insertion direction.

4. The insertion system for electrical conductors according to claim 3, wherein the guide part is provided in an annular shape and is multiply partitioned into multiply partitioned guide parts in a circumferential direction, and
    wherein the insertion system further comprises a second moving part that causes the multiply partitioned guide parts to respectively move in a radial direction.

5. The insertion system for electrical conductors according to claim 2, wherein the guide part is provided in an annular shape and is multiply partitioned into multiply partitioned guide parts in a circumferential direction, and wherein the insertion system further comprises a second moving part that causes the multiply partitioned guide parts to respectively move in a radial direction.

6. The insertion system for electrical conductors according to claim 1, wherein the guide part has a tapered structure that spreads in an opposite direction to the insertion direction.

7. The insertion system for electrical conductors according to claim 6, wherein the guide part is provided in an annular shape and is multiply partitioned into multiply partitioned guide parts in a circumferential direction, and wherein the insertion system further comprises a second moving part that causes the multiply partitioned guide parts to respectively move in a radial direction.

8. The insertion system for electrical conductors according to claim 1, wherein the guide part is provided in an annular shape and is multiply partitioned into multiply partitioned guide parts in a circumferential direction, and wherein the insertion system further comprises a second moving part that causes the multiply partitioned guide parts to respectively move in a radial direction.

\* \* \* \* \*